United States Patent
Novak et al.

(10) Patent No.: US 9,930,689 B2
(45) Date of Patent: Mar. 27, 2018

(54) PROXIMITY SIGNALING AND PROCEDURE FOR LTE

(71) Applicant: BlackBerry Limited, Waterloo (CA)

(72) Inventors: Robert Novak, Stittsville (CA); Biswaroop Mukherjee, Stittsville (CA); Masoud Ebrahimi Tazeh Mahalleh, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 120 days.

(21) Appl. No.: 13/889,996

(22) Filed: May 8, 2013

(65) Prior Publication Data

US 2014/0334388 A1 Nov. 13, 2014

(51) Int. Cl.
*H04W 64/00* (2009.01)
*H04W 72/12* (2009.01)
*H04L 5/00* (2006.01)
*H04L 27/26* (2006.01)

(52) U.S. Cl.
CPC ....... *H04W 72/1263* (2013.01); *H04L 5/0053* (2013.01); *H04L 5/0069* (2013.01); *H04W 64/00* (2013.01); *H04L 5/0055* (2013.01); *H04L 27/2613* (2013.01)

(58) Field of Classification Search
CPC .............. H04W 72/1263; H04W 64/00; H04L 5/0048; H04L 27/2613; H04L 5/0069; H04L 5/0055; H04L 5/0053
USPC ......................................... 370/281, 311, 329
See application file for complete search history.

(56) References Cited

U.S. PATENT DOCUMENTS

| 2011/0237231 | A1* | 9/2011 | Horneman ........ H04W 52/0216 455/414.1 |
| 2011/0258313 | A1 | 10/2011 | Mallik et al. |
| 2011/0268101 | A1* | 11/2011 | Wang et al. .................. 370/344 |
| 2013/0122893 | A1* | 5/2013 | Turtinen ............... H04W 8/005 455/423 |
| 2013/0170414 | A1* | 7/2013 | Kwon .......................... 370/311 |
| 2013/0288668 | A1* | 10/2013 | Pragada ................ H04W 12/06 455/426.1 |

(Continued)

FOREIGN PATENT DOCUMENTS

| EP | 2665298 A1 | 11/2013 |
| WO | 2012170794 A1 | 12/2012 |

OTHER PUBLICATIONS

3GPP TS 36.331 V11.3.0; 3rd Generation Partnership Project; Technical Specification Group Radio Access Network; Evolved Universal Terrestrial Radio Access (E-UTRA); Radio Resource Control (RRC); Protocol Specification; Release 11; Mar. 2013; 344 pages.

(Continued)

*Primary Examiner* — Redentor Pasia
*Assistant Examiner* — Peter Mak
(74) *Attorney, Agent, or Firm* — Conley Rose, P.C.; J. Robert Brown, Jr.; Albert A. Abbou

(57) ABSTRACT

A method for communication in a wireless telecommunications system is provided. The method comprises receiving, by a first UE, a reference signal transmitted by a second UE and transmitting, by the first UE to a network node, a report indicating that the reference signal was received. The reference signal is received in a detection opportunity that occurs as one of a single detection opportunity or a portion of a pattern of detection opportunities.

30 Claims, 22 Drawing Sheets

(56) References Cited

U.S. PATENT DOCUMENTS

| | | | | |
|---|---|---|---|---|
| 2014/0003262 A1* | 1/2014 | He | ........................ | H04W 28/08 370/252 |
| 2014/0029596 A1* | 1/2014 | Li | ........................ | H04W 8/005 370/338 |
| 2014/0185495 A1* | 7/2014 | Kuchibhotla | ....... | H04W 76/023 370/281 |
| 2015/0365942 A1* | 12/2015 | Niu | ........................ | H04W 74/02 370/330 |

OTHER PUBLICATIONS

Novak, Robert, et al.; U.S. Appl. No. 13/723,926; filed Dec. 21, 2012; Title: Network-Managed Direct Device to Device Communications.

Novak, Robert, et al.; U.S. Appl. No. 13/724,020; filed Dec. 21, 2012; Title: Network-Managed Direct Device to Device Communications.

Novak, Robert, et al.; U.S. Appl. No. 13/724,254; filed Dec. 21, 2012; Title: User-Equipment-Managed Direct Device to Device Communications.

Novak, Robert, et al.; U.S. Appl. No. 13/724,723; filed Dec. 21, 2012; Title: User-Equipment-Managed Direct Device to Device Communications.

Novak, Robert, et al.; U.S. Appl. No. 13/725,174; filed Dec. 21, 2012; Title: Resource Scheduling in Direct Device to Device Communications Systems.

Novak, Robert, et al.; U.S. Appl. No. 13/725,562; filed Dec. 21, 2012; Title: Resource Scheduling in Direct Device to Device Communications Systems.

Novak, Robert, et al.; U.S. Appl. No. 13/725,570; filed Dec. 21, 2012; Title: Managing Sessions for Direct Device to Device Communications.

Gage, William Anthony, et al.; U.S. Appl. No. 13/750,331; filed Jan. 25, 2013; Title: Proximity and Interest Determination by a Wireless Device.

Ebrahimi Tazeh Mahalleh, Masoud, et al.; U.S. Appl. No. 13/854,515; filed Apr. 1, 2013; Title: Aligning Timing for Direct Communications.

PCT International Search Report; Application No. PCT/US2013/040163; dated Mar. 25, 2014; 4 pages.

PCT Written Opinion of the International Searching Authority; Application No. PCT/US2013/040163; dated Mar. 25, 2014; 11 pages.

3GPP TSG RAN WG1 Meeting #72bis; "Evaluation Scenarios for D2D"; R1-131166; Chicago, USA; Apr. 15-19, 2013; 6 pages.

Canadian Office Action; Application No. 2,911,228; dated Dec. 12, 2016; 5 pages.

Canadian Office Action; Application No. 2,911,228; dated Oct. 26, 2017; 4 pages.

* cited by examiner

Table 1. Illustrative Prox-RS ID configuration with cyclic shift and pattern assigned.

| ID | Signal Configuration | Pattern |
|----|---------------------|---------|
| 1  | Cyclic shift 1, ... | T T R R |
| 2  | Cyclic shift 2, ... | T R T R |
| 3  | Cyclic shift 3, ... | R T R T |
| 4  | Cyclic shift 4, ... | R R T T |

Figure 2

Table 2. Table for 8 Prox-RSs patterns

| ID | Signal Configuration | Pattern |
|---|---|---|
| 1 | Cyclic shift 1, ... | T R T T R R |
| 2 | Cyclic shift 2, ... | T R T R T R |
| 3 | Cyclic shift 3, ... | T R R T R T |
| 4 | Cyclic shift 4, ... | T R R R T T |
| 5 | Cyclic shift 5, ... | R T T T R R |
| 6 | Cyclic shift 6, ... | R T T R T R |
| 7 | Cyclic shift 7, ... | R T R T R T |
| 8 | Cyclic shift 8, ... | R T R R T T |

Table 3. Table for 16 Prox-RSs patterns

| ID | Signal Configuration | Pattern |
|---|---|---|
| 1 | Cyclic shift 1, ... | T R T R T T R R |
| 2 | Cyclic shift 2, ... | T R T R T R T R |
| 3 | Cyclic shift 3, ... | T R T R R T R T |
| 4 | Cyclic shift 4, ... | T R T R R R T T |
| 5 | Cyclic shift 5, ... | T R R T T T R R |
| 6 | Cyclic shift 6, ... | T R R T T R T R |
| 7 | Cyclic shift 7, ... | T R R T R T R T |
| 8 | Cyclic shift 8, ... | T R R T R R T T |
| 9 | Cyclic shift 9, ... | R T T R T T R R |
| 10 | Cyclic shift 10, ... | R T T R T R T R |
| 11 | Cyclic shift 11, ... | R T T R R T R T |
| 12 | Cyclic shift 12, ... | R T R T T R R T T |
| 13 | Cyclic shift 13, ... | R T R T T T R R |
| 14 | Cyclic shift 14, ... | R T R T T R T R |
| 15 | Cyclic shift 15, ... | R T R T R T R T |
| 16 | Cyclic shift 16, ... | R T R T R R T T |

Figure 4

Table 4. Table for 8 Prox-RSs patterns with sequential transmission

| ID | Signal Configuration | Pattern |
|---|---|---|
| 1 | Cyclic shift 1, ... | T R R R R R R R |
| 2 | Cyclic shift 2, ... | R T R R R R R R |
| 3 | Cyclic shift 3, ... | R R T R R R R R |
| 4 | Cyclic shift 4, ... | R R R T R R R R |
| 5 | Cyclic shift 5, ... | R R R R T R R R |
| 6 | Cyclic shift 6, ... | R R R R R T R R |
| 7 | Cyclic shift 7, ... | R R R R R R T R |
| 8 | Cyclic shift 8, ... | R R R R R R R T |

Table 5. Table for 16 Prox-RSs patterns with sequential transmission

| ID | Signal Configuration | Pattern |
|---|---|---|
| 1 | Cyclic shift 1, ... | T R R R R R R R R R R R R R R R |
| 2 | Cyclic shift 2, ... | R T R R R R R R R R R R R R R R |
| 3 | Cyclic shift 3, ... | R R T R R R R R R R R R R R R R |
| 4 | Cyclic shift 4, ... | R R R T R R R R R R R R R R R R |
| 5 | Cyclic shift 5, ... | R R R R T R R R R R R R R R R R |
| 6 | Cyclic shift 6, ... | R R R R R T R R R R R R R R R R |
| 7 | Cyclic shift 7, ... | R R R R R R T R R R R R R R R R |
| 8 | Cyclic shift 8, ... | R R R R R R R T R R R R R R R R |
| 9 | Cyclic shift 9, ... | R R R R R R R R T R R R R R R R |
| 10 | Cyclic shift 10, ... | R R R R R R R R R T R R R R R R |
| 11 | Cyclic shift 11, ... | R R R R R R R R R R T R R R R R |
| 12 | Cyclic shift 12, ... | R R R R R R R R R R R T R R R R |
| 13 | Cyclic shift 13, ... | R R R R R R R R R R R R T R R R |
| 14 | Cyclic shift 14, ... | R R R R R R R R R R R R R T R R |
| 15 | Cyclic shift 15, ... | R R R R R R R R R R R R R R T R |
| 16 | Cyclic shift 16, ... | R R R R R R R R R R R R R R R T |

Figure 5

Table 6. Illustrative Prox-RS ID configuration with cyclic shift and pattern assigned (ID 1-4) with complementary set (ID 5-8).

| ID | Signal Configuration | Pattern |
|---|---|---|
| 1 | Cyclic shift 1, ... | T T R R |
| 2 | Cyclic shift 2, ... | T R T R |
| 3 | Cyclic shift 3, ... | R T R T |
| 4 | Cyclic shift 4, ... | R R T T |
| 5 | Cyclic shift 1, ... | R R T T |
| 6 | Cyclic shift 2, ... | R T R T |
| 7 | Cyclic shift 3, ... | T R T R |
| 8 | Cyclic shift 4, ... | T T R R |

Figure 7

*ProxRS-Config* information element

```
-- ASN1START

ProxRS-ConfigCommon ::=         CHOICE {
    release                     NULL,
    setup                       SEQUENCE {
        proxrs-BandwidthConfig          ENUMERATED {bw0, bw1, bw2, bw3, bw4,
bw5, bw6, bw7},
        proxrs-SubframeConfig           ENUMERATED {
                                        sc0, sc1, sc2, sc3, sc4, sc5, sc6, sc7,
                                        sc8, sc9, sc10, sc11, sc12, sc13, sc14,
sc15},
        ackNackProxRS-SimultaneousTransmission BOOLEAN,
        proxrs-MaxUpPts                 ENUMERATED {true}         OPTIONAL --
Cond TDD
    }
}
ProxRS-ConfigDedicated ::=      CHOICE{
    release                     NULL,
    setup                       SEQUENCE {
        proxrs-Bandwidth                ENUMERATED {bw0, bw1, bw2, bw3},
        proxrs-HoppingBandwidth         ENUMERATED {hbw0, hbw1, hbw2, hbw3},
        freqDomainPosition              INTEGER (0..23),
        duration                        BOOLEAN, ENUMERATED {d0, d1, d2, d3, d4,
d5, d6, d7},
        proxrs-ConfigIndex              INTEGER (0..1023),
        transmissionComb                INTEGER (0..1),
        cyclicShift                     ENUMERATED {cs0, cs1, cs2, cs3, cs4,
cs5, cs6, cs7}
    }
}
SRS-AntennaPort ::=             ENUMERATED {an1, an2, an4, spare1}

-- ASN1STOP
```

Figure 9a

| ProxRS-Config field descriptions |
|---|
| ackNackSRS-SimultaneousTransmission <br> Parameter: *Simultaneous-AN-and-ProxRS*, see TS 36.213 [23, 8.2]. For SCells this field is not applicable and the UE shall ignore the value. |
| cyclicShift, <br> Parameter: n_ProxRS for signal transmission respectively. See TS 36.211 [21, 5.5.3.1], where cs0 corresponds to 0 etc. |
| duration <br> Parameter: Duration for proximity RS signal transmission, where d0 corresponds to a single transmission and d7 corresponds to "indefinite". |
| freqDomainPosition, <br> Parameter: $n_{RRC}$ for proximity reference signal transmission respectively, see TS 36.211 [21, 5.5.3.2]. |
| proxrs-AntennaPort, <br> Indicates the number of antenna ports used for proximity sounding reference signal transmission respectively, see TS 36.211 [21, 5.5.3]. |
| proxrs-Bandwidth, <br> Parameter: $B_{ProxRS}$ for proximity reference signal transmission respectively, see TS 36.211 [21, tables 5.5.3.2-1, 5.5.3.2-2, 5.5.3.2-3 and 5.5.3.2-4]. |
| proxrs-BandwidthConfig <br> Parameter: ProxRS Bandwidth Configuration. See TS 36.211, [21, table 5.5.3.2-1, 5.5.3.2-2, 5.5.3.2-3 and 5.5.3.2-4]. Actual configuration depends on UL bandwidth. bw0 corresponds to value 0, bw1 to value 1 and so on. |
| proxrs-ConfigIndex, <br> Parameter: $I_{ProxRS}$ for proximity reference signal transmission respectively. The value indicates the transmission pattern (if used), and periodicity of Prox-RS transmissions. |
| proxrs-HoppingBandwidth <br> Parameter: ProxRS hopping bandwidth $b_{hop} \in \{0,1,2,3\}$ for periodic sounding reference signal transmission, see TS 36.211 [21, 5.5.3.2] where hbw0 corresponds to value 0, hbw1 to value 1 and so on. |
| proxrs-MaxUpPts <br> Parameter: proxrsMaxUpPts, see TS 36.211 [21, 5.5.3.2]. If this field is present, reconfiguration of $m_{ProxRS,0}^{max}$ applies for UpPts, otherwise reconfiguration does not apply. |
| proxrs-SubframeConfig <br> Parameter: ProxRS SubframeConfiguration. See TS 36.211, [21, table 5.5.3.3-1] applies for FDD whereas TS 36.211, [21, table 5.5.3.3-2] applies for TDD. sc0 corresponds to value 0, sc1 to value 1 and so on. |
| transmissionComb, transmissionCombAp <br> Parameter: $\bar{k}_{TC} \in \{0,1\}$ for periodic and aperiodic sounding reference signal transmission respectively, see TS 36.211 [21, 5.5.3.2]. |

| Conditional presence | Explanation |
|---|---|
| TDD | This field is optional present for TDD, need OR; it is not present for FDD and the UE shall delete any existing value for this field. |

Figure 9b

*ProxRS-Config* information element (alternate 1)

```
-- ASN1START

ProxRS-ConfigCommon ::=        CHOICE {
    release                        NULL,
    setup                          SEQUENCE {
        proxrs-BandwidthConfig         ENUMERATED {bw0, bw1, bw2, bw3, bw4,
bw5, bw6, bw7},
        proxrs-SubframeConfig          ENUMERATED {
            sc0, sc1, sc2, sc3, sc4, sc5, sc6, sc7,
            sc8, sc9, sc10, sc11, sc12, sc13, sc14,
sc15},
        ackNackProxRS-SimultaneousTransmission BOOLEAN,
        proxrs-MaxUpPts                ENUMERATED {true}         OPTIONAL --
Cond TDD
    }
}

ProxRS-ConfigDedicated ::=     CHOICE{
    release                        NULL,
    setup                          SEQUENCE {
        proxrs-Bandwidth               ENUMERATED {bw0, bw1, bw2, bw3},
        proxrs-HoppingBandwidth        ENUMERATED {hbw0, hbw1, hbw2, hbw3},
        freqDomainPosition             INTEGER (0..23),
        duration                       BOOLEAN ENUMERATED {d0, d1, d2, d3, d4,
d5, d6, d7},
        proxrs-Id                      INTEGER (0..XXX),
        transmissionComb               INTEGER (0..1),
    }
}

SRS-AntennaPort ::=            ENUMERATED {an1, an2, an4, spare1}

-- ASN1STOP
```

*proxrs-id*
Parameter: $I_{ProxRS}$ for proximity reference signal transmission respectively. The value indicates the transmission pattern (if used), cyclic shift, and periodicity of Prox-RS transmissions.

Figure 10

*ProxRS-Config* information element (alternate 2)

```
-- ASN1START

ProxRS-ConfigCommon ::=      CHOICE {
    release                  NULL,
    setup                    SEQUENCE {
        proxrs-BandwidthConfig           ENUMERATED (bw0, bw1, bw2, bw3, bw4,
bw5, bw6, bw7),
        proxrs-SubframeConfig            ENUMERATED (
                                 sc0, sc1, sc2, sc3, sc4, sc5, sc6, sc7,
                                 sc8, sc9, sc10, sc11, sc12, sc13, sc14,
sc15),
        ackNackProxRS-SimultaneousTransmission BOOLEAN,
        proxrs-MaxUpPts                  ENUMERATED (true)        OPTIONAL --
Cond TDD
    }
}

ProxRS-ConfigDedicated ::=   CHOICE{
    release                  NULL,
    setup                    SEQUENCE {
        duration                         BOOLEAN ENUMERATED (d0, d1, d2, d3, d4,
d5, d6, d7),
        proxrs-Id                        INTEGER (0..XXX),
    }
}

SRS-AntennaPort ::=          ENUMERATED (an1, an2, an4, spare1)

-- ASN1STOP
```

*proxrs-Id*
Parameter: $I_{ProxRS}$ for proximity reference signal transmission respectively. The value indicates the transmission pattern (if used), parameters *proxrs-Bandwidth*, *proxrs-HoppingBandwidth*, *freqDomainPosition*, *transmissionComb* cyclic shift, and periodicity of Prox-RS transmissions

Figure 11

*ProxRACH-ConfigDedicated* information element

```
-- ASN1START

ProxRACH-ConfigDedicated ::=    SEQUENCE {
    proxra-PreambleIndex            INTEGER (0..63),
    proxra-PRACH-MaskIndex          INTEGER (0..15)
}

-- ASN1STOP
```

| *Prox*RACH-ConfigDedicated field descriptions |
|---|
| *proxra-PRACH-MaskIndex* |
| Explicitly signalled PRACH Mask Index for *Prox*RA Resource selection in TS 36.321 [6]. |
| *proxra-PreambleIndex* |
| Explicitly signalled Random Access Preamble for *Prox*RA Resource selection in TS 36.321 [6]. |

Figure 12

*ProxRACH-ConfigDedicated* information element (alternate)

```
-- ASN1START

ProxRACH-ConfigDedicated ::=    SEQUENCE {
    proxra-PreambleIndex            INTEGER (0..63),
    proxra-PRACH-MaskIndex          INTEGER (0..15)
    duration                        BOOLEAN ENUMERATED {d0, d1, d2, d3, d4, d5,
d6, d7},
}
-- ASN1STOP
```

| ProxRACH-ConfigDedicated field descriptions |
|---|
| proxra-PRACH-MaskIndex <br> Explicitly signalled PRACH Mask Index for *Prox*RA Resource selection in TS 36.321 [6]. |
| proxra-PreambleIndex <br> Explicitly signalled Random Access Preamble for *Prox*RA Resource selection in TS 36.321 [6]. |
| duration <br> Parameter: Duration for proximity RACH signal transmission, where d0 corresponds to a single transmission and d7 corresponds to "indefinite". |

Figure 13

*ProxRS-DetectConfig* information element (eNB-directed detection)

```
-- ASN1START

ProxRS-ConfigCommon ::=        CHOICE {
    release                    NULL,
    setup                      SEQUENCE {
        proxrs-BandwidthConfig     ENUMERATED {bw0, bw1, bw2, bw3, bw4,
bw5, bw6, bw7},
        proxrs-SubframeConfig      ENUMERATED {
                                   sc0, sc1, sc2, sc3, sc4, sc5, sc6, sc7,
                                   sc8, sc9, sc10, sc11, sc12, sc13, sc14,
sc15},
        ackNackProxRS-SimultaneousTransmission BOOLEAN,
        proxrs-MaxUpPts            ENUMERATED {true}          OPTIONAL --
Cond TDD
    }
}

ProxRS-ConfigDetectDedicated ::=   CHOICE{
    release                    NULL,
    prox-vid                   INTEGER (0..1024),
    proxreport-interval        ENUMERATED {ri0, ri1, ri2, ri3}, OPTIONAL
    setup                      SEQUENCE {
        proxrs-Bandwidth           ENUMERATED {bw0, bw1, bw2, bw3},
        proxrs-HoppingBandwidth    ENUMERATED {hbw0, hbw1, hbw2, hbw3},
        freqDomainPosition         INTEGER (0..23),
        duration                   BOOLEAN, ENUMERATED {d0, d1, d2, d3, d4,
d5, d6, d7},
        proxrs-ConfigIndex         INTEGER (0..1023),
        transmissionComb           INTEGER (0..1),
        cyclicShift                ENUMERATED {cs0, cs1, cs2, cs3, cs4,
cs5, cs6, cs7}
    }
}

SRS-AntennaPort ::=            ENUMERATED {an1, an2, an4, spare1}

-- ASN1STOP
```

| ProxRS-Config field descriptions |
|---|
| prox-vid |
| Parameter: *proximity virtual identifier*. This value is used by the UE and eNB in further configurations and reporting of the associated Prox-RS configuration given in the setup. |
| proxreport-interval |
| Parameter: the proximity report interval. This value indicates the interval at which reporting of proximity detections occur. (in some embodiments, this is omitted as it is configured in the specifications) |

Figure 14

*ProxRS-DetectConfig* information element (Promiscuous detection)

```
-- ASN1START

ProxRS-ConfigCommon ::=       CHOICE {
    release                   NULL,
    setup                     SEQUENCE {
        proxrs-BandwidthConfig          ENUMERATED (bw0, bw1, bw2, bw3, bw4,
bw5, bw6, bw7),
        proxrs-SubframeConfig           ENUMERATED {
                                        sc0, sc1, sc2, sc3, sc4, sc5, sc6, sc7,
                                        sc8, sc9, sc10, sc11, sc12, sc13, sc14,
sc15},
        ackNackProxRS-SimultaneousTransmission BOOLEAN,
        proxrs-MaxUpPts                 ENUMERATED (true)       OPTIONAL --
Cond TDD
    }
}

ProxRS-ConfigDetectDedicated ::=   CHOICE{
    release                   NULL,
    proxreport-interval       ENUMERATED (ri0, ri1, ri2, ri3), OPTIONAL
    duration                  BOOLEAN, ENUMERATED (d0, d1, d2, d3, d4, d5,
d6, d7),

}

SRS-AntennaPort ::=           ENUMERATED (an1, an2, an4, spare1)

-- ASN1STOP
```

| |
|---|
| *duration* |
| Parameter: Duration for proximity RS signal detection, where d0 corresponds to a single transmission and d7 corresponds to "indefinite". |
| *proxreport-interval* |
| Parameter: the proximity report interval. This value indicates the interval at which reporting of proximity detections occur. (in some embodiments, this is omitted as it is configured in the specifications) |

Figure 15

*ProxRS-Config* information element (Alternate 2, with detection indication)

```
-- ASN1START

ProxRS-ConfigCommon ::=        CHOICE {
    release                        NULL,
    setup                          SEQUENCE {
        proxrs-BandwidthConfig         ENUMERATED (bw0, bw1, bw2, bw3, bw4,
bw5, bw6, bw7),
        proxrs-SubframeConfig          ENUMERATED (
                                       sc0, sc1, sc2, sc3, sc4, sc5, sc6, sc7,
                                       sc8, sc9, sc10, sc11, sc12, sc13, sc14,
sc15),
        ackNackProxRS-SimultaneousTransmission BOOLEAN,
        proxrs-MaxUpPts                ENUMERATED (true)        OPTIONAL --
Cond TDD
    }
}

ProxRS-ConfigDedicated ::=    CHOICE{
    release                        NULL,
    detect                         BOOLEAN,
    proxreport-interval            ENUMERATED (ri0, ri1, ri2, ri3), OPTIONAL
    setup                          SEQUENCE {
        duration                       BOOLEAN ENUMERATED (d0, d1, d2, d3, d4,
d5, d6, d7),
        proxrs-id                      INTEGER (0..XXX),
    }
}

SRS-AntennaPort ::=            ENUMERATED (an1, an2, an4, spare1)

-- ASN1STOP
```

*detect*
Parameter: Detection of other ProxRS-ID in the Prox-RS- ConfigCommon. FALSE indicates no additional
detection action by the UE. TRUE indicates detection according to Prox-RS ConfigCommon signalled.

Figure 16

*ProxRSMeasurementReport message*

```
-- ASN1START

ProxRSMeasurementReport ::=        SEQUENCE {
    proxrs-Id                          INTEGER (0..1024),
    signalstrength                     INTEGER (-100..23),
}

-- ASN1STOP
```
signalstrength
Parameter: The received signal strength of the proximity RS. The integer is the signal strength in dBM. (in some embodiments, a CQI or Boolean measurement could be given on the reception of the proximity RS)

Figure 17

*ProxRSMeasurementReport message (alternate 1)*

```
-- ASN1START

ProxRSMeasurementReport ::=        SEQUENCE {
    proxrs-Id                          INTEGER (0..1024),
    signalstrength                     INTEGER (-100..23), }

-- ASN1STOP
```

Figure 18

*ProxRSMeasurementReport message (alternate 2)*

```
-- ASN1START

ProxRSMeasurementReport ::=        SEQUENCE {
    signalstrength                     INTEGER (-100..23), }
    proxrs-ConfigIndex                     INTEGER (0..1023),
    cyclicShift                            ENUMERATED {cs0, cs1, cs2, cs3, cs4, cs5, cs6, cs7}

-- ASN1STOP
```

Figure 19

*ProxRSMeasurementReport message (alternate 3)*

```
-- ASN1START

ProxRSMeasurementReport ::=        SEQUENCE {
    signalstrength                     INTEGER (-100..23), }
    proxra-PreambleIndex                   INTEGER (0..63),
    proxra-PRACH-subframe                  INTEGER (0..15)

-- ASN1STOP
```

Figure 20

PROXIMITY SIGNALING AND PROCEDURE FOR LTE

FIELD OF THE DISCLOSURE

The present disclosure relates to the detection of the proximity of devices in wireless telecommunications systems.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component may be referred to herein as an eNB, but it should be understood that such a component is not necessarily an eNB. Such a component may also be referred to herein as a network node.

LTE may be said to correspond to Third Generation Partnership Project (3GPP) Release 8 (Rel-8), Release 9 (Rel-9), and Release 10 (Rel-10), and possibly also to releases beyond Release 10, while LTE Advanced (LTE-A) may be said to correspond to Release 10, Release 11 (Rel-11), and possibly also to releases beyond Release 10 and Release 11. As used herein, the terms "legacy", "legacy UE", and the like might refer to signals, UEs, and/or other entities that comply with LTE Release 10 and/or earlier releases but do not comply with releases later than Release 10. The terms "advanced", "advanced UE", and the like might refer to signals, UEs, and/or other entities that comply with LTE Release 11 and/or later releases. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is a table of an illustrative proximity reference signal ID configuration, according to an embodiment of the disclosure.

FIG. 4 contains tables of proximity reference signal patterns, according to an embodiment of the disclosure.

FIG. 5 contains tables of proximity reference signal patterns, according to an alternative embodiment of the disclosure.

FIG. 7 is a table of an illustrative proximity reference signal ID configuration, according to an alternative embodiment of the disclosure.

FIGS. 9a and 9b illustrate a ProxRS-Config information element, according to an embodiment of the disclosure.

FIG. 10 illustrates a ProxRS-Config information element, according to an alternative embodiment of the disclosure.

FIG. 11 illustrates a ProxRS-Config information element, according to another alternative embodiment of the disclosure.

FIG. 12 illustrates a ProxRACH-ConfigDedicated information element, according to an embodiment of the disclosure.

FIG. 13 illustrates a ProxRACH-ConfigDedicated information element, according to an alternative embodiment of the disclosure.

FIG. 14 illustrates a ProxRS-DetectConfig information element, according to an embodiment of the disclosure.

FIG. 15 illustrates a ProxRS-DetectConfig information element, according to an alternative embodiment of the disclosure.

FIG. 16 illustrates a ProxRS-DetectConfig information element, according to another alternative embodiment of the disclosure.

FIG. 17 illustrates a ProxRSMeasurementReport message, according to an embodiment of the disclosure.

FIG. 18 illustrates a ProxRSMeasurementReport message, according to an alternative embodiment of the disclosure.

FIG. 19 illustrates a ProxRSMeasurementReport message, according to another alternative embodiment of the disclosure.

FIG. 20 illustrates a ProxRSMeasurementReport message, according to yet another alternative embodiment of the disclosure.

DETAILED DESCRIPTION

Figure 1:
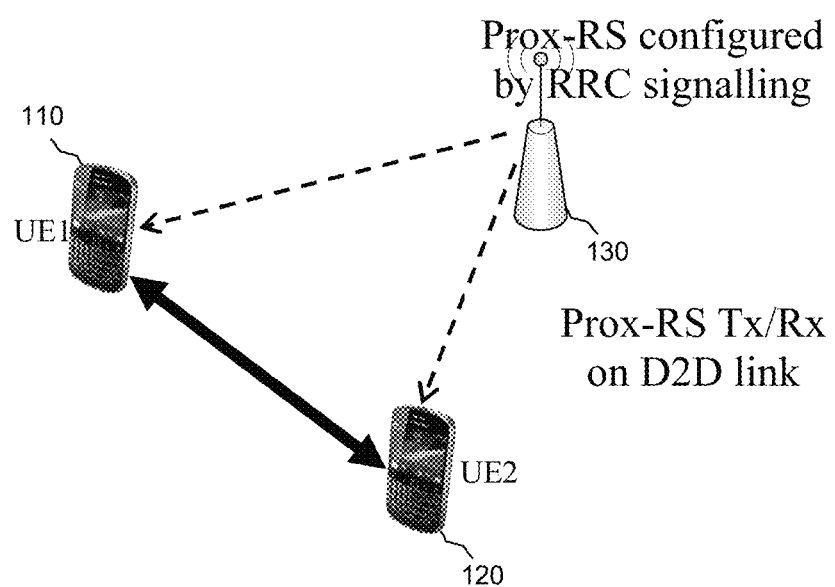
FIG. 1 is a diagram of a UE-UE proximity detection configured by a network, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

Embodiments of the present disclosure provide mechanisms and procedures for configuring the transmission and reception of proximity reference signals that may be used to determine the proximity of two or more UEs. That is, an eNB may transmit to a plurality of UEs configuration information that specifies when the UEs are to transmit a proximity reference signal and when the UEs are to attempt to detect a proximity reference signal from another UE. A UE that has detected a proximity reference signal may inform the eNB of the detection, thereby indicating to the eNB that the UE is in the proximity of another UE. The eNB may then inform a plurality of UEs that they are in the proximity of one another. In some cases, such information may allow the UEs to engage in device-to-device communication. The proximity reference signal may be configured for a single transmission and detection opportunity or for multiple transmission and detection opportunities. In the case of multiple transmission and detection opportunities, a set of transmission patterns may be configured such that each UE in a plurality of UEs has an opportunity to detect a proximity reference signal sent by each of the other UEs.

LTE procedures do not currently define mechanisms to enable a UE to determine if another UE is in direct communication range. That is, LTE does not specify how a UE can discover whether another UE is nearby or how a UE can determine whether a nearby UE continues to be within range. The proximity of UEs to one another may be determined by methods not specified by LTE, such as network-based positioning techniques, but there is inherent error in such location measurements, particularly when used to estimate the distance between two UEs. Further, such location measurements cannot be used to determine the channel quality between UEs, which may be needed for further communication after proximity determination. In addition, since a UE has a limited battery capacity, it may not be desirable for a UE to constantly scan for signals from other UEs.

Device-to-device communication is supported by the ad hoc mode of unlicensed band protocols such those described in IEEE standard 802.11. In such communication techniques, a first UE may send periodic beacons to allow a second UE to recognize the first UE and initiate a device-to-device session. Such a scheme consumes battery power due to the need for beaconing and scanning for other UEs' beacons. In addition, higher-layer security mechanisms may be needed to protect a UE from unauthorized and potentially malicious communications.

In an embodiment, proximity detection between UEs may be achieved by assigning to one or more UEs a proximity reference signal (Prox-RS) that can be detected by other UEs. Feedback from UEs regarding detected Prox-RSs may be used by a network node, such as an eNB, to determine which UEs are in proximity to each other. The UEs in such a system may be assumed to have the capability to receive and transmit control information with the network node for the purpose of configuring resources for proximity discovery.

Such a system is illustrated in FIG. 1. A discoverable UE 110 may be assigned a Prox-RS with specific parameters such that nearby listening UEs, such as UE 120, may be able to detect the Prox-RS. The listening UE 120 may inform a network node 130, such as an eNB, that a Prox-RS has been detected. The listening UE 120, together with the network node 130, may then determine the identity of the UE 110 transmitting the Prox-RS.

Configuration information for transmissions and receptions of the Prox-RS may be sent from a network node to a plurality of UEs via radio resource control (RRC) signaling or medium access control (MAC) messages or through other static or standardized configurations. In some embodiments, the Prox-RS may be transmitted via a signal not currently defined. In other embodiments, the Prox-RS may be applied to an existing signal, such as a sounding reference signal (SRS) or any of several physical layer (PHY) structures including, but not limited to, physical random access channels (PRACH), primary and secondary synchronization signals (PSS/SSS), or other reference signals or beacons.

In an embodiment, a Prox-RS may be associated with a set of parameters, such as code, cyclic shift, modulation, root sequence, and/or time/frequency resources, that are associated with transmission of that Prox-RS. The Prox-RS parameters may also include an assigned periodicity, which may be referred to as the Prox-RS periodicity (PRSP), for several subsequent Prox-RS transmissions. The Prox-RS parameters may also include a transmission pattern and its period, which may be referred to as the proximity pattern repetition period (PPRP). Prox-RS transmissions or receptions for a UE may occur within recurring subframes, which may be referred to as Prox-RS opportunities. That is, a Prox-RS opportunity may be defined as a set of periodically recurring time/frequency resources in which a UE may be configured to transmit a Prox-RS, and the Prox-RS opportunities may recur with the PPRP. The Prox-RS parameters may define specific resources for a plurality of Prox-RS transmissions, wherein the set of Prox-RSs for a plurality of UEs is configured such that each UE has an opportunity to transmit to and listen to each of the other UEs. A discoverable UE that is also listening may be configured to detect other UEs' Prox-RS transmissions in Prox-RS opportunities when it is configured to not transmit. The Prox-RS parameters may further specify that Prox-RS transmissions discontinue after a specific number of transmissions or a specified length of time.

The Prox-RS opportunities may be single subframes or orthogonal frequency division multiplexing (OFDM) symbols or a set of time/frequency resources that may recur periodically. In an embodiment, a Prox-RS may be configured to occur in a specific OFDM symbol of a subframe, such as every $n^{th}$ subframe where n is an integer one or greater. In another embodiment, Prox-RS opportunities may be a set of periodically recurring adjacent or substantially adjacent symbols or subframes in which a UE may be configured to transmit a Prox-RS. Constraining a set of Prox-RS opportunities to occupy a small number of adjacent subframes may improve UE battery life by allowing the UE to 'sleep' longer between subframes in which it receives or transmits a Prox-RS. By contrast, if a UE must 'wake up' to transmit or receive Prox-RS in non-adjacent subframes, there will be more transition periods to and from its sleeping state, leading to extra use of battery power during the transitions. In summary, an assigned Prox-RS may consist of a single Prox-RS transmission, a series of repeated Prox-RS transmissions, a series of periodic Prox-RS transmissions, and/or a series of Prox-RS transmissions with an assigned pattern.

In an embodiment, a UE may be assigned a Prox-RS via the configuration of a Prox-RS identifier that may uniquely identify a Prox-RS and that may be referred to as the Prox-RS ID. If a UE is assigned a Prox-RS ID, the Prox-RS ID may provide a pattern indicating the Prox-RS opportunity resources in which a UE is to transmit its assigned Prox-RS and the opportunities in which the UE should not transmit its Prox-RS. The Prox-RS ID may be associated with a set of parameters for transmission of that Prox-RS, such as time/frequency resources and/or other parameters mentioned above. For example, if the Prox-RS uses the SRS, the Prox-RS ID may define the root sequence, the cyclic shift, the periodicity, and other transmission parameters of the SRS assignment. The parameters associated with the Prox-RS ID may be standardized and made known to a plurality of UEs and an eNB. In this way, a UE may be configured to transmit or detect a Prox-RS with a specific set of parameters by an indication of the Prox-RS ID, rather than an explicit listing of the parameters. However, the common resources for all Prox-RS transmissions in a cell may still need to be indicated to the UE.

In an embodiment, the Prox-RS assignment to a UE provides distinct reception patterns as well as transmission patterns. The transmission patterns indicate in which Prox-RS opportunity resources a UE is to transmit its assigned Prox-RS, whereas the reception patterns indicate in which Prox-RS opportunity resources a UE is to attempt to detect Prox-RS transmissions. A discoverable UE that is also listening may be configured to detect Prox-RS transmissions in Prox-RS resources according to a reception pattern. If the transmission and reception patterns "collide" such that a UE would simultaneously receive and transmit on a resource, a rule may be used to resolve the collision. For example, the rule may be that the UE only transmits when there is a collision or that the UE only receives when there is a collision.

Prox-RS transmission opportunities may be periodic, but for a single Prox-RS pattern, transmissions may not occur periodically. For a given Prox-RS pattern, the pattern may be repeated with the PPRP that is received as part of Prox-RS configuration, but the pattern itself may not contain periodic Prox-RS transmissions. For example, if a UE is assigned the Prox-RS ID 1 pattern in Table 1 in FIG. 2, the UE will transmit in the Prox-RS opportunity in the first frame and second frame, but not in the third frame or fourth frame. The UE will then begin repeating the pattern by transmitting in again in the fifth and sixth frame opportunities, but not the seventh and eighth frames. Hence, it can be seen the UE does not transmit periodically as it does not transmit in each frame, but the UE does transmit according to a pattern that is periodic and does repeat.

For example, if a Prox-RS is one sequence from a set of cyclically shifted Zadoff-Chu sequences based on a common root, the Prox-RS ID may be configured such that, for each Prox-RS ID, there is a corresponding cyclic shift and transmission pattern, as shown in Table 1. In addition, the signal configuration in Table 1 may comprise parameters such as resources or a frequency hopping pattern, or a base sequence/code generator may be added to the table.

Figure 3:
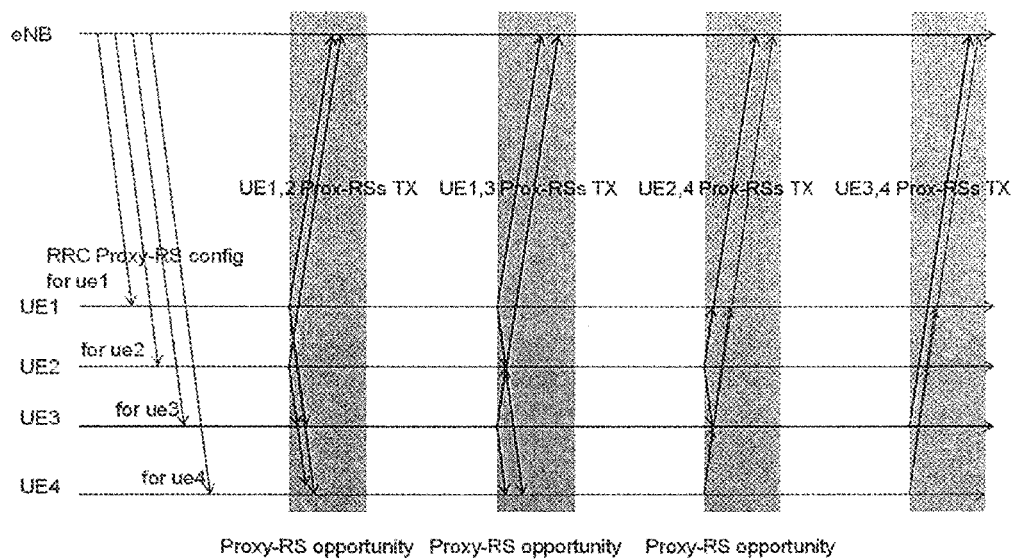
FIG. 3 is a sequence diagram for a proximity reference signal, according to an embodiment of the disclosure.

A discoverable UE assigned a Prox-RS ID may transmit the assigned signal according to such a pattern on periodically allocated Prox-RS resources. Upon completion of the pattern, the UE may repeat the pattern until de-assignment of that proximity configuration or until the end of the configured transmission window. For example, in FIG. 3, UE1 is transmitting based on the periodically occurring resources according to ID 1 from Table 1. In the first four opportunities, UE1 follows the assigned pattern of transmitting twice and then muting twice. The UE begins the pattern again in the fifth opportunity. During the opportunities where the UE is muted from transmitting its Prox-RS, it may be configured to listen for Prox-RSs from other UEs.

While Table 1 shows a fixed finite table of aligned patterns, additional UEs that need proximity indication may be added to a system at any time. For example, when a first UE that desires proximity indication enters the system, the eNB may assign pattern ID 1 to the UE. When the next UE enters the system, the eNB may assign pattern ID 2, and so on. Additional UEs that request proximity service may be provided one of the available patterns or Prox-RS IDs from the set of defined patterns or Prox-RS IDs. If there are more UEs than the number of currently configured patterns, the eNB may assign a new resource set (time, frequency, code, etc.) and allocate Prox-RS IDs or patterns in that new set of resources to the additional UEs.

Alternatively, patterns may be generated according to pseudo-random sequences that are known or can be derived at the transmitting UE and receiving UE. For example, a UE may use or be assigned a pseudo-random sequence, where each element of the sequence corresponds to either transmission (e.g., "1") or muting (e.g., "0"). Different UEs may be assigned different sequences. Alternatively, sequences may be derived at least in part from the UE ID (such as the cell radio network temporary identifier (C-RNTI)) or some other seed.

In an embodiment, the patterns may be constructed so that within each set of patterns each UE in a plurality of UEs is ensured to have at least one opportunity to receive a Prox-RS from each of the other UEs during one cycle of the pattern. For a small number of UEs, a simple pattern set such as one UE transmitting in each opportunity may be used. For a larger number of UEs, a pattern that minimizes the total time for a set of transmissions may be used, where the total time is related to the number of time division opportunities.

More specifically, for a larger numbers of UEs, a binary tree may be employed, resulting in $T=2\lceil \log_2 N \rceil$ time resources, where N is the number of discoverable UEs. For example, in the simplified case in which $N=2^n$, an N-way discovery problem exists. The UEs may be divided into two groups, $A_1$ and $A_2$, each with N/2 UEs. In the first time unit, UEs in $A_1$ may transmit Prox-RS and UEs in $A_2$ may receive Prox-RS. UEs in $A_2$ may preferably monitor all Prox-RSs in $A_1$. In the second time unit, UEs in $A_2$ may transmit and UEs in $A_1$ may receive. So, after two time units, each UE in $A_1$ has received once from each UE in $A_2$ and vice versa. A subsequent step may ensure that all UEs in $A_1$ receive from each other at least once and that all UEs in $A_2$ also receive from each other at least once. Two N/2-way discovery problems now exist. These two discovery problems may be solved simultaneously by repeating the first step for each of $A_1$ and $A_2$. That is, $A_1$ may be divided into $A_{11}$ and $A_{12}$, and two time units may be spent for the UEs in $A_{11}$ and $A_{12}$ to discover each other. These steps may continue until there is only one UE in each set. The number of such steps is n or $\log_2(N)$. Since two time units are needed in each step, the total number of required time units is $2*\log_2(N)$. If N is not an integer exponent of 2, then the required number of time units is $2\lceil \log_2 N \rceil$. If at least N/2 Prox-RS resources are available for each of the time instances, the amount of resources used over the time instances is equal to $N/2 \times 2\lceil \log_2 N \rceil = N \log_2(N)$.

The Prox-RS patterns may be expanded to the cases for eight or 16 Prox-RS IDs, cyclic shifts, and patterns. An embodiment of a Prox-RS pattern for eight Prox-RS IDs is illustrated in Table 2 in FIG. 4, and an embodiment of a Prox-RS pattern for 16 Prox-RS IDs is illustrated in Table 3 in FIG. 4.

Tables 1, 2, and 3 illustrate binary tree-type patterns. In another configuration, each transmitter transmits its Prox-RS sequentially, with all other receivers listening. Embodiments of Prox-RS patterns for eight and 16 Prox-RS IDs with sequential transmission are illustrated in Tables 4 and 5, respectively, in FIG. 5. For eight Prox-RS IDs, eight time resources are needed (as opposed to six in Table 2), and for 16 Prox-RS IDs, 16 time resources are needed (as opposed to eight in Table 3). The sequential table formats in Tables 4 and 5 have the advantage of having a UE transmit only once per Prox-RS ID pattern period, thereby saving battery power associated with transmission.

In an embodiment, patterns may be constructed to minimize the total Prox-RS resources used in a discovery cycle. For example, p UEs may send a Prox-RS in one time unit and N-p UEs may receive these transmissions. Multiplexing p UEs at a time, N/p=q units of time may be required to allow each UE to send one Prox-RS transmission. However, the UEs that are multiplexed in the same time unit may not receive each other's Prox-RS transmissions. In order for the UEs to receive each other's Prox-RS transmissions, each UE may have to transmit one more time, this time multiplexed with UEs that were not multiplexed together during their first transmission. This can be accomplished in another p time units. Thus, in a total of p+q time units, all of the pxq=N UEs may send and receive Prox-RS transmissions from each other. Minimizing for (p+q) results in $p=q=\sqrt{N}$. Hence, a Prox-RS transmission pattern that minimizes the total Prox-RS resources for a given set of N UEs may be one that multiplexes $\sqrt{N}$ Prox-RS resources per time unit and has a pattern of $\sqrt{N}$ time units or Prox-RS opportunities.

In an embodiment, a set of Prox-RS patterns may be configured or otherwise made known to the UEs in addition to the particular instance of the pattern that a UE is expected to follow. In an embodiment, the eNB may compute patterns specific to each UE and convey a pattern to a UE. For example, a pattern transmit and receive of length 16 may be conveyed by a length-16 field of a Prox-RS configuration message, such as an RRC message. The Prox-RS configuration may be provided or changed after a UE sends an indication for proximity interest.

A receiving UE may use the knowledge of a discoverable UE's Prox-RS pattern to listen for the discoverable UE's Prox-RS in multiple opportunities. The receiving UE may soft combine the received signals prior to a decision regarding the presence or absence of the discoverable UE's proximity signal. Thus, knowing the pattern may aid the receiving UE in knowing which Prox-RS opportunities to use when soft combining the Prox-RSs.

In an embodiment, if the Prox-RS pattern is not known to listening UEs, the listening UEs may report per RS period. These reports may be consolidated by the network node, which may know the RSs that were transmitted. The network node may then determine the proximities of the UEs based on the consolidated reports.

In an embodiment, the listening UEs may be aware of the Prox-RS periodicity and the pattern periodicity without knowing the exact transmission pattern of the discoverable UEs. A listening UE may then determine the pattern as well as the proximity.

Figure 6:
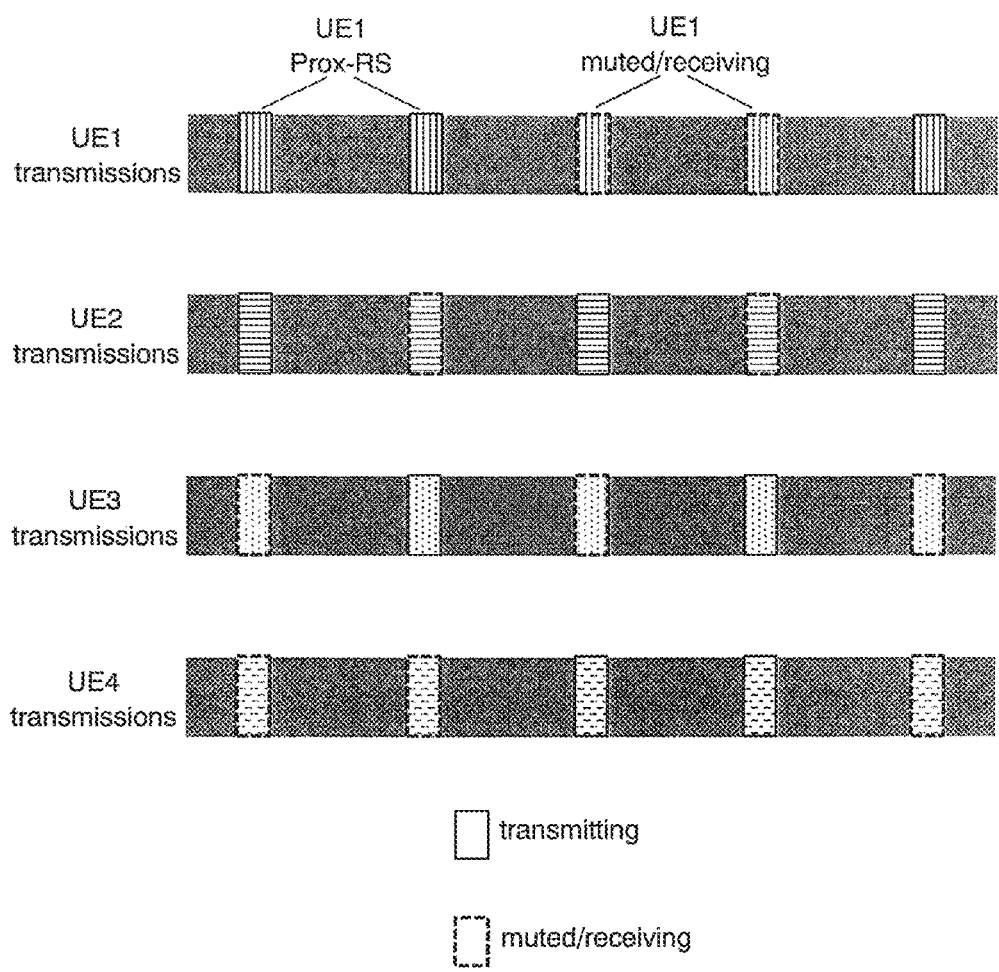
FIG. 6 is diagram of UE proximity reference signal transmission patterns, according to an alternative embodiment of the disclosure.

In an embodiment, the Prox-RS ID may refer to a unique signal for a UE to use in specific Prox-RS resources. This unique signal may differ from another signal in cyclic shifts, base sequences, code generators, and/or other signal parameters. For example, FIG. 6 illustrates UE Prox-RS transmission patterns according to the Prox-RS ID assignments in Table 1. A UE may be assigned a unique signal within the resources shown such that UEs that expect to receive in a particular Prox-RS resource are able to distinguish the transmitting UEs uniquely from other transmitting UEs in the same Prox-RS resources. Therefore, detection of a Prox-RS in any Prox-RS transmission opportunity is sufficient to uniquely identify a nearby UE.

In an embodiment, a Prox-RS ID may refer to a unique signal for a UE to use in specific Prox-RS transmission opportunities, but that signal may be defined by a second Prox-RS ID for use by a second UE during Prox-RS transmission opportunities in which the first UE is muted. This is exemplified in the patterns given in Table 6 in FIG. 7. In this example, the first set of four UEs use the transmission patterns according to Table 1 and as illustrated in FIG. 6. The second complementary set of UEs—UE5, UE6, UE7, and UE8—reuse the same signals but in opposite patterns to the first set. For example, UE5, using the opposite pattern to UE1, transmits a signal with cyclic shift 1 in the pattern RRTT. Within each set, each UE is ensured to have at least one opportunity to receive from all other UEs in the set and also have its transmission received by all others in the set. However, this is not ensured between UEs of different sets. Therefore, to identify a nearby UE, a receiving UE may need to report both the received signal and the corresponding transmission opportunity to the network node. In Table 6, if all IDs are in use, then each UE may detect only six of the seven other UEs using this scheme.

Such a method may be used in embodiments where it is not essential for one set, such as IDs 1-4, to detect another set, such as IDs 5-8. Such a configuration may be used when resources are used for different proximity services or procedures or for different discovery groups. Multiplexing the sets of Prox-RS patterns in this manner may allow one set of resources to be used for both sets of patterns and hence may reduce the overall number of resources needed for the two sets.

The network may assign a UE a Prox-RS ID for use in specific resources for a single transmission or for limited-time transmissions. In the case of a single transmission, the UE may transmit the Prox-RS signal according to the parameters of the Prox-RS ID once. In the case of limited-time transmissions, the UE may transmit the Prox-RS signal according to the parameters of the Prox-RS ID one or more times as directed by the configuration parameters. The Prox-RS transmissions may terminate in the latter case without the need of an additional RRC message to reconfigure the assignment.

In an embodiment, limited-time transmissions may be configured as single transmissions. For example, a UE may be configured for a single transmission of a random access channel (RACH) preamble by the eNB. Alternatively, limited-time transmissions may be configured as repeated transmissions. For example, a UE may be configured with a RACH preamble and mask (as per RACH configuration in LTE) for multiple transmissions. In some embodiments, the single transmission is indicated by a physical downlink control channel (PDCCH) signal. The PDCCH signal may be in the form of a Device Control Information (DCI) that contains a set of fields that when interpreted together by a device configured to perform limited time proximity (e.g., via RRC messages) indicate that proximity signal command from the eNB. The command may be for a proximity signal transmission or reception to be performed by the device. In some embodiments, the DCI may contain indications for several devices to perform proximity transmission or reception.

The Prox-RS may be used in conjunction with the discontinuous reception (DRX) states in a UE. In an embodiment, a Prox-RS configuration includes an indication of the UE action in cases where Prox-RS transmission is configured to occur when the UE is in DRX OFF state and in cases where Prox-RS transmission is configured to occur when the UE is in DRX ON state.

In an embodiment, when the UE is in DRX OFF state, in the subset of subframes where the Prox-RS is configured to be transmitted and/or received by a UE, the UE transmits or receives the Prox-RS, but need not receive the PDCCH and therefore may not receive the physical downlink shared channel (PDSCH) or transmit on the physical uplink shared channel (PUSCH). As such, the UE's function is the same as in the typical DRX OFF state, with an exception made for the transmission or reception of the Prox-RS. Further, the measurement report of the received Prox-RS may occur only when the UE is in DRX ON state. In an embodiment, a UE remains in DRX OFF state for only the transmission or the reception of the Prox-RS signals, but not both.

In an embodiment, in the subset of subframes where the Prox-RS is configured to be transmitted or received, the UE is in DRX ON state. If the UE was otherwise in DRX OFF state, the UE transitions to DRX ON state for the subframes where the UE is configured to transmit or receive Prox-RS. In an embodiment, the configuration provided to a UE indicates that the UE shall remain in DRX ON state for only the transmission or the reception of the Prox-RS signals, but not both.

In an embodiment, the configuration may indicate that transmission of the Prox-RS signals is to be suspended if the UE is in DRX OFF state. In an embodiment, the configuration may indicate that reception of the Prox-RS signals is to be suspended if the UE is in DRX OFF state.

In some embodiments, the configuration of a UE's actions in DRX is specified in an eNB configuration or a standards specification instead of being transmitted to the UE along with transmission or detection configurations.

In an embodiment, a UE may be configured to attempt detection of a Prox-RS from other UEs in either a "promiscuous" mode or a "directed" mode. In the promiscuous mode, the UE listens for all of the Prox-RSs and reports those that were detected to the network node. In the directed mode, the UE is configured by the network node to listen for a subset of the Prox-RSs and report only those within the subset that were detected. The subset may refer to a subset of resources, time opportunities, and/or specific patterns or signals.

In either mode, reporting of the detected signals may entail either binary decision detection or further detailed signal strength measurements of one or more received Prox-RS signals. That is, signal strength may be quantized by a one-bit response that indicates reception of the Prox-RS above a threshold or by a multiple-bit signal strength measurement that can provide further detail of the Prox-RS power, such as a quantized dBm measurement.

In the promiscuous detection mode, a UE attempts detection of all possible Prox-RSs for a cell, network node, or network. For example, a UE connected to a cell may attempt to receive all Prox-RSs that the UE is aware of, such as the Prox-RSs that are configured for that cell. The UE may obtain information regarding the configured Prox-RSs from a system information broadcast (SIB) or RRC messaging. For example, a UE may be aware of the possible preambles (e.g., RACH configurations) or cyclic shifts (e.g., SRS type configurations) for a given common Prox-RS resource configuration from a standards specification or otherwise. The UE may then be signaled one or more Prox-RS common configurations via RRC or SIB and begin detection of possible Prox-RS transmissions in those resources. For example, if a Prox-RS is configured as an SRS transmission, then the UE may be signaled the Prox-RS as an SRS common configuration. The Prox-RS configurations allowed may be a subset of those for SRS and may be only periodically occurring Prox-RS with one of 16 cyclic shifts. A UE employing promiscuous detection may then search the Prox-RS resources for those cyclic shifts according to standardized and signaled configurations.

In an embodiment, a UE may be instructed by the network node to listen for all Prox-RSs from one or more neighboring cells. Alternatively, the UE may be configured to attempt to detect all Prox-RSs for any cell that may be in the network. Such a configuration may be given by the network node or may be a static or standardized configuration.

In an embodiment, a UE may be informed of the set of Prox-RSs to monitor partially from signaling, such as RRC or SIB, and partially from standardization or configuration. In this way, the signaling to indicate the set of Prox-RSs to monitor may be reduced. For example, if SRS is used for Prox-RS signaling, the eNB may indicate an SRS configuration consisting of one or more resource locations and/or base sequences in use. The UE may already know how an SRS is signaled from standardization or configurations, as well as possible cyclic shifts in use for Prox-RS purposes and possible transmission patterns. One or more other parameters may be standardized or known from a configuration and therefore may not have to be explicitly signaled, such as the SRS bandwidth or the set of base sequences.

In some cases of promiscuous detection, the UE may not be provided with an indication of which Prox-RSs are in use at given time but may be limited to information regarding the possible set of Prox-RSs that may be in use or could potentially be configured. Whether or not a Prox-RS in use is signaled may depend on signaling overhead limitations and the ease of representing whether or not the Prox-RS is in use given the set of configurations. The manner in which a UE detects and reports these Prox-RSs may depend on whether a known pattern or a single transmission of Prox-RS has been defined. Both may be defined, so a combination of reporting may be configured.

In an embodiment, a UE that has detected a Prox-RS may report the detected Prox-RS to a network node, for example, by reporting the subframe, resource, code sequence, or other parameters of the detected Prox-RS. Detections may be reported on the physical uplink control channel (PUCCH), MAC, or RRC channels, but RRC may be the most useful messaging. The UE may report the set of Prox-RS IDs detected. Alternatively, the UE may report a positive acknowledgement (ACK) or negative acknowledgement (NACK) of whether or not a particular Prox-RS ID was detected. The detection of a Prox-RS ID may be reported as a bitmap, with each element of the bitmap corresponding to a Prox-RS ID and the value of each element of the bitmap corresponding to the presence or absence of that Prox-RS ID. For example, a UE may be configured to detect all Prox-RSs associated with a set of resources defined by the eNB. Given the Prox-RS resource configuration, the UE may determine from standards specification and configuration parameters that the number of possible Prox-RSs is N. The UE may then report a bitmap indicating the detection of any of the configured possible Prox-RSs.

In other cases, the UE attempts to detect a Prox-RS according to a single transmission of a Prox-RS signal in a specific Prox-RS resource or set of resources. While a detection report may be based on a single detection or attempted detection, the Prox-RS signal transmitted may have been configured as a pattern of transmissions or a single transmission from a UE. In some embodiments, the UE may report to the eNB individual parameters of the detected Prox-RS, such as the base sequence, cyclic shift, time and/or frequency resource. In other embodiments, the UE may report the Prox-RS ID corresponding to the parameters of the detected signal. The detections may be reported through RRC or MAC signaling.

In other embodiments, the UE may simply report an ACK or NACK to the eNB corresponding to the detected presence or absence of a signal with the parameters specified by the network node. In such a reporting scheme, a UE in the promiscuous mode may attempt to detect all signals in a single transmission opportunity and may report whether or not each of the potential signals is detected. In some cases, each opportunity is a single resource for one Prox-RS ID, and hence for each opportunity only one report ("ACK/NACK") may be required. In other cases, an opportunity may consist of potentially many signals being detected, and hence the report may need to have multiple indications.

In some cases, the Prox-RS pattern may not be known to detecting UEs, and the UEs may report per RS period to the eNB. In an embodiment, these reports may be consolidated by the network node if the network node knows which Prox-RSs were transmitted. The consolidated reports may then be used to derive proximity. If there is a mix of single transmissions and known transmission patterns present in a resource, the UE may be configured to report according to the single transmission method. The UE may report immediately after detecting a Prox-RS transmission, or the UE may be configured to store Prox-RS detections over a reporting period or interval.

As mentioned above, in addition to the promiscuous mode just described, detection of a Prox-RS may occur in a network-directed mode. In the directed mode, a UE is configured by a network node to listen for a subset of the Prox-RS. The subset may refer to a subset of resources, time opportunities, and/or specific patterns or signals. The subset may be defined by a list of Prox-RS IDs or by a set of Prox-RS configuration parameters, such as base sequence, cyclic shift, and time and/or frequency resources. The UE may be configured to listen for a subset of Prox-RSs by RRC signaling. The network node may update this information as the Prox-RSs in use change. Detecting a subset of the Prox-RSs may significantly reduce the complexity of detection at the UE.

In an embodiment, the UE may report the set of Prox-RS IDs detected. Alternatively, the UE may report an ACK or NACK to indicate whether or not a particular Prox-RS ID was detected. The ACK or NACK may be reported as a bitmap, with each element of the bitmap corresponding to a Prox-RS ID and the value of each element of the bitmap corresponding to the detection or absence of detection of that Prox-RS ID. Alternatively, the UE may report individual parameters of the detected Prox-RS, such as base sequence, cyclic shift, and time/frequency resources. The UE may report immediately after detecting a configured Prox-RS transmission or may be configured to store Prox-RS detections over a reporting period or interval.

In an embodiment of the directed mode, the UE may attempt to detect Prox-RS according to the known transmission patterns, sequences, and Prox-RS locations defined for each Prox-RS ID that the UE is configured to detect. As described above, if a pattern is defined for a Prox-RS ID, the UE may utilize soft combining of multiple transmissions in order to enhance the Prox-RS signal reception. In another embodiment of the directed mode, the UE may attempt to detect Prox-RS according to a single transmission of each Prox-RS ID for which the UE is configured to listen. In either case, the UE may use the information regarding the parameters for each Prox-RS ID to determine which of the Prox-RSs are present.

The UE may report the set of Prox-RS IDs detected from the set the UE was configured to listen for. Alternatively, the UE may report an ACK or NACK regarding whether or not a particular Prox-RS ID was detected. In either case, the report may be transmitted by one of multiple channels, including a MAC message or an RRC message. In some cases, the UE may report parameters of the detected Prox-RS according to the directed detection configuration. For example, the UE may report information that indicates the sequence detected, the Prox-RS resource index, and/or the time location of the Prox-RS resources.

This detection and reporting procedure may be used when one or more UEs are configured for single transmission of a Prox-RS. Alternatively, a UE may attempt to detect single instances of Prox-RS transmissions from UEs assigned a Prox-RS transmission pattern. However, this pattern may or may not be known to the detecting UE.

The detection reports may be consolidated by the network node if the network node knows which Prox-RSs were transmitted. The consolidated reports may then be used to derive proximity. For example, a UE may report the detected proximity signals via RRC. The UE may report the parameters of the Prox-RSs detected in a given proximity opportunity along with the proximity opportunity identifier, such as the subframe or frame number of the proximity opportunity. If the UE is directed to detect a specific set of single transmissions, the eNB may assign virtual Prox-RS IDs to each of these directed detections, in which case the UE may need to report only the virtual Prox-RS IDs detected rather than detailed parameters. The UE may further combine several reports from several proximity opportunity detections into an RRC message. The may UE report immediately after detecting a Prox-RS transmission or may be configured to store Prox-RS detections over a reporting period or interval.

In an embodiment, a network node may provide further detection assistance information to improve Prox-RS detection at the UE. For example, the network node may provide a UE with the set of Prox-RSs in use. Using this information, the UE may more reliably detect the Prox-RSs in use as the UE can eliminate the possibility of transmission of Prox-RSs that are not currently assigned. Such assistance information may be used in the promiscuous mode, where the UE is searching for all Prox-RSs, and also in the network node-directed mode, where the UE is searching for a subset of the configured Prox-RSs. In the promiscuous mode, the UE may use this additional information to limit its search and detection to the set of Prox-RSs in use rather than all those potentially configured. In the network node-directed mode, the UE may use this information not to limit its search, but to aid in its network node directed Prox-RS searches by knowing that the remaining configured Prox-RSs in use are potential sources of false detections.

As an example of the latter case, a scenario may be considered where an SRS-like signal is used as a Prox-RS and only cyclic shifts (CS) 1, 3, 5, and 7 are configured to be used. UE1 may be assigned CS1 as its Prox-RS, and UE2 may be directed to detect the proximity of UE1 by attempting to detect the existence of CS1. If the receiving UE2 is not aware that only CS 1, 3, 5, and 7 are used, there is a chance that CS2 may be erroneously detected (i.e., a false detection), and UE1 (with Prox-RS CS1) may be declared not to be in the proximity (i.e., a missed detection). In this case, to improve detection, the network node may provide UE2 with the set of Prox-RSs in use (i.e., CS 1, 3, 5, and 7). UE2 may then be able to eliminate CS2 as a potential Prox-RS and potentially increase its possibility of correctly detecting CS 1.

In an embodiment, when Prox-RS transmissions are ongoing and follow a known pattern, a first listening UE may be configured to track a second transmitting UE in order to obtain proximity information from the second UE at a future time. The first UE may be configured to detect the proximity of the second UE according to one of the methods described above. After the second UE is detected, the first UE may continue to listen for the Prox-RS of the second UE in order to track the proximity of the second UE. In an embodiment, when a UE is first directed by a network node to detect the proximity of another UE, the indication to detect proximity may also imply tracking the other UE.

For example, an eNB may note that among a plurality of UEs there is a UE2 that is of particular interest to UE1. In this case, the eNB may configure UE1 with a Prox-RS configuration that does not require the UE1 to detect proximity with UEs other than UE2 or may configure UE1 to detect proximity with the other UEs less frequently. In such a case, UE1 may be said to be tracking UE2. Further, it may happen that UE2 is interested in proximity information with UE1 more than with other UEs. In such cases, a similar configuration may be provided to UE2.

In an embodiment, when a UE is tracking another UE, the tracking UE may not report the Prox-RS detection of the other UE to the network node after the initial detection. In other embodiments, the reporting of Prox-RS after initial detection may be less frequent than initial detection reporting. In some embodiments, after the initial detection and reporting of the detection, the tracking UE may not report the detected Prox-RS again until the expiration of a timer that was reset at the time of the last report or detection or until configured or requested to do so by the network node. In other embodiments, after the initial detection and reporting of the detection, the tracking UE may report to the network node only when the tracking UE determines that the other UE is out of proximity.

In some cases, a UE or the eNB may determine the need to discontinue Prox-RS assignments. For example, a UE may no longer need to allow other UEs to determine its proximity, or a UE may decide to discontinue proximity detection functions to save battery life and therefore may terminate its allocation of Prox-RS. Alternatively, the eNB may decide to discontinue the allocation of the Prox-RS to a UE. The termination of Prox-RS transmissions and/or detections for a given UE may be achieved through additional RRC signaling to the UE or a MAC reconfiguration message to the UE. Alternatively, rather than waiting for an explicit RRC or MAC reconfiguration, a UE may be assigned Prox-RSs with a pattern assignment that expires. The expiration may be controlled by a timer that runs for a specified period of time after being activated upon the initial configuration of the Prox-RS or the first transmission of the Prox-RS. Alternatively, the expiration may be a maximum number of transmissions that is activated upon the first transmission of the Prox-RS. For example, the number of transmission may be equal to "1" in the case of single transmission Prox-RS configurations. In either alternative, the expiration value may be specified in the standard specifications or configured in a RRC reconfiguration message.

Details will now be provided regarding the messages that may be used for transmission configuration, detection configuration, and reporting. The discussion hereinafter will focus on RRC messages, but similar considerations may apply to MAC messages.

Figure 8:
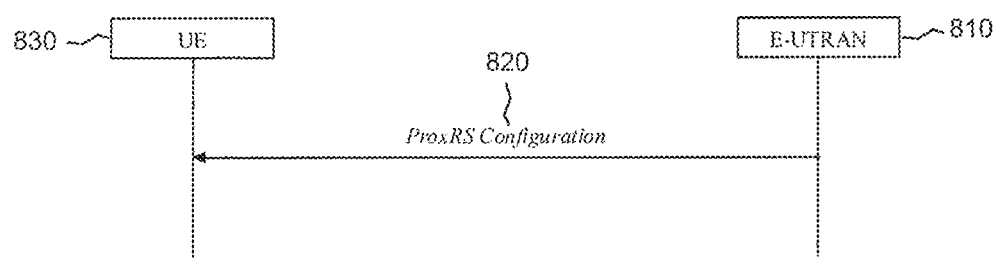
FIG. 8 is a message flow diagram for proximity reference signal information acquisition, according to an embodiment of the disclosure.

The configuration of a Prox-RS pattern may be given in an RRC message such as that illustrated in FIG. 8, where a network node 810, such as an eNB, sends a Prox-RS configuration message 820 to a UE 830. A similar diagram may apply to the transmission of a detection configuration message. In the case of a reporting message, the message would be sent from the UE 830 to the network node 810.

As mentioned above, the Prox-RS may use SRS signaling, and hence the configuration message for a transmission pattern may be based on the SRS-Config information element (IE). Two IEs are disclosed herein: a common configuration for assigned resources for all Prox-RSs and a dedicated configuration of the Prox-RS for use by a UE.

In an embodiment, a new set of resources may be used for the Prox-RS transmissions, in which case a ProxRS-ConfigCommon IE may be included in an RRC message to UEs. Alternatively, where the Prox-RS reuses resources for SRS transmissions, the ProxRS-ConfigCommon IE may not be sent. However, an SRS-ConfigCommon IE may be included. In an embodiment, a ProxRS-Config IE (with common and dedicated parts) may be defined as shown in FIGS. 9*a* and 9*b*. In FIGS. 9*a*, 9*b*, and subsequent figures, newly disclosed items are underlined and deleted items are stricken through.

In an alternative ProxRS-Config IE, the proxrs-ConfigIndex parameter and cyclicshift parameter may be included in a single table, as in Table 1 of FIG. 2, where a configuration and a cyclic shift are given by the Prox-RS ID. Such an alternative ProxRS-Config is shown in FIG. 10.

In an embodiment, the parameters proxrs-Bandwidth, proxrs-HoppingBandwidth, freqDomainPosition, and transmissionComb may be indicated by the Prox-RS ID and hence may not need to be included in an IE. An example of such an alternative IE is illustrated in FIG. 11.

In an embodiment, the Prox-RS may reuse RACH-type signaling. In such cases, a variant of the RACH-ConfigDedicated IE may be used to assign the Prox-RS to a UE. This IE may be denoted as ProxRACH-ConfigDedicated when the physical RACH signal is used as the Prox-RS. The time/frequency resources used for Prox-RS using RACH may be the same as those for the RACH, or additional time/frequency resources may be assigned for Prox-RS using RACH. An example ProxRACH-ConfigDedicated IE is illustrated in FIG. 12.

In an embodiment, when a UE is be assigned to transmit the Prox-RS as a recurring Prox-RACH, a duration field may be used to indicate whether a single transmission, multiple transmissions, or indefinite transmission of the dedicated Prox-RS is assigned. An example of such an alternative ProxRACH-ConfigDedicated IE is illustrated in FIG. 13.

As in the case of Prox-RS transmission configuration, a message for a Prox-RS detection configuration may be based on the SRS-Config IE. Two types of IEs are disclosed herein: a common configuration for assigned resources for all Prox-RSs and a dedicated detection configuration of the Prox-RS for use by the UE.

In an embodiment, a new set of resources may be used for the Prox-RS transmissions, in which case a ProxRS-ConfigCommon may be included in an RRC message to UEs for detection. Alternatively, where the Prox-RS reuses resources for SRS transmissions, the ProxRS-ConfigCommon may not be sent. However, an SRS-ConfigCommon may be included.

In some embodiments, the eNB may send the same Prox-RS configuration to more than one UE. For example, the eNB may send a configuration for Prox-RS ID #1 and associated parameters in an RRC message and then send another configuration for Prox-RS ID #1 and associated parameters to a second UE in a separate RRC message such that both UEs may transmit the same Prox-RS on the same resources. This common Prox-RS assignment may simplify detection in cases of a large number of UEs.

In some embodiments, as part of a multiple step proximity detection method, a UE may receive at least one additional Prox-RS configuration after receiving an initial Prox-RS configuration. The additional Prox-RS configuration may be sent to the UE by an eNB after the eNB has received a detection report pertaining to the UE. In such a multi-step method, a first UE may transmit a Prox-RS that is commonly assigned to at least one other UE. Once detected by a second UE and reported to the eNB, further disambiguation of the UE may be needed if UE-specific proximity is desired. In such cases, the first UE may be assigned another Prox-RS for the second UE to detect in a second stage of the proximity detection procedure. Two or more stages may be needed depending on the number of Prox-RS available, among other factors.

Two types of detection configuration IEs are disclosed herein: an eNB-directed detection configuration IE and a promiscuous detection configuration IE, corresponding to the two detection modes disclosed above. For the eNB-directed detection configuration, an example ProxRS-DetectConfig IE (with common and dedicated parts) is illustrated in FIG. 14. For the promiscuous detection configuration, an example ProxRS-DetectConfig IE (with common and dedicated parts) is illustrated in FIG. 15.

In some embodiments, the UE determines the resources for promiscuous detection from a broadcast system information block (SIB) rather than an RRC. In these cases, a UE may receive the Prox-RS-ConfigCommon as illustrated in FIG. 15 in an SIB rather than RRC message. The UE may not receive an RRC message for reporting configuration in this case and may use a defined measurement report IE for this purpose. Note that a UE may be in RRC IDLE or RRC connected mode when receiving the SIB. If the UE was in RRC IDLE mode when performing promiscuous detection of Prox-RS signals, the UE may initiate RRC connection establishment prior to reporting to the eNB.

In an embodiment, the transmission configuration message may be combined with the detection configuration message. For example, in the case of transmission of a Prox-RS and detection of all other Prox-RSs on the Prox-RS common resources, the ProxRS-Config IE in FIG. 16 may be transmitted.

In an embodiment, a detected Prox-RS may be reported in a new measurement report, or a report of the detection may be added to the measurementreport defined in 3GPP Technical Specification (TS) 36.331. In some measurement reports, the UE may specify the signal strength of the Prox-RS based on the Prox-RS virtual id (proxrs-vid) indicated in the detection configuration RRC message. For example, a new ProxRSMeasurementReport message may be defined as illustrated in FIG. 17.

In other measurement reports, the UE may specify the signal strength of the Prox-RS based on the Prox-RS ID (proxrs-ld) as specified in a standard or otherwise configured. An example of such a message is illustrated in FIG. 18.

In still other measurement reports, the UE may specify the signal strength of the Prox-RS based on the Prox-RS ID parameters as measured. For example, for the SRS-type Prox-RS, the cyclic shift and configuration index may be the primary means for identification, as illustrated in FIG. 19.

In another example, for the RACH-type Prox-RS, the preamble index and PRACH subframe may be the primary means for identification, as illustrated in FIG. 20.

The preceding discussion has been directed toward the configuration, detection, and reporting of proximity signals within the coverage of a network. The embodiments described may be applicable in the absence of network coverage if a UE receives relevant information from sources other than from the network directly. For example, the UE may be given a Prox-RS transmission, detection, and/or reporting configuration via a semi-static configuration, potentially from downloadable sources or some other pre-provisioning of the configuration. In the case of Prox-RS transmission, the configuration may alternatively be determined by the random selection of a proximity signal from a configured set of signals. In addition, timing synchronization may be required in order for UEs to discover other UEs and for patterns to be reused as described above. In the absence of the network, such time synchronization may be provided by one or more of the UEs.

Figure 21:
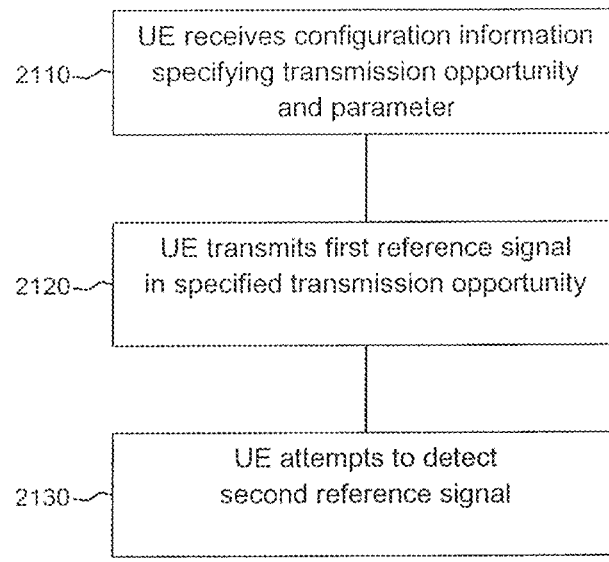
FIG. 21 is a flowchart depicting a method for communication in a wireless telecommunications system, according to an embodiment of the disclosure.

An embodiment of a method for communication in a wireless telecommunications system is illustrated in FIG. 21. At block 2110, a UE receives configuration information specifying at least one transmission opportunity in which the UE is to transmit a first reference signal and further specifying at least one parameter applicable to the transmission of the first reference signal. At block 2120, the UE transmits the first reference signal in the specified transmission opportunity. At block 2130, the UE attempts to detect a second reference signal that has at least one parameter that is the same as a parameter of the first reference signal. The detection attempt occurs in a detection opportunity that occurs at a different time from the transmission opportunity.

Figure 22:
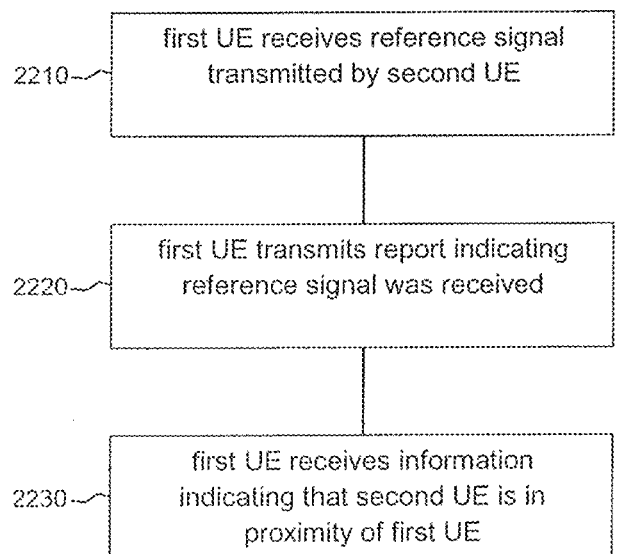
FIG. 22 is a flowchart depicting a method for communication in a wireless telecommunications system, according to another embodiment of the disclosure.

An embodiment of another method for communication in a wireless telecommunications system is illustrated in FIG. 22. At block 2210, a first UE receives a reference signal transmitted by a second UE. At block 2220, the first UE transmits to a network node a report indicating that the reference signal was received. At block 2230, the first UE receives from the network node information indicating that the second UE is in the proximity of the first UE.

The embodiments disclosed herein allow for the configuration of proximity discovery signals. Pattern-based proximity signaling allows for simple detection and reporting by other UEs according to the pattern and signal details observed. The mechanism allows for easy tracking of detected UEs. Patterns for half-duplex UEs allow all UEs an opportunity to detect all other UEs in a system. Knowledge of patterns by detecting UEs allows for soft combining of multiple transmissions for detection. Limited-time proximity signaling does not require deallocation, as a time-out may occur. Limited-time proximity signaling also minimizes signaling of proximity signals, which may be efficient for one-time proximity discovery, and simplifies multiplexing of the proximity transmissions and receptions of many UEs. The embodiments provide maximum proximity detection opportunities for a minimum allocation of resources otherwise in use by the network.

Figure 23:
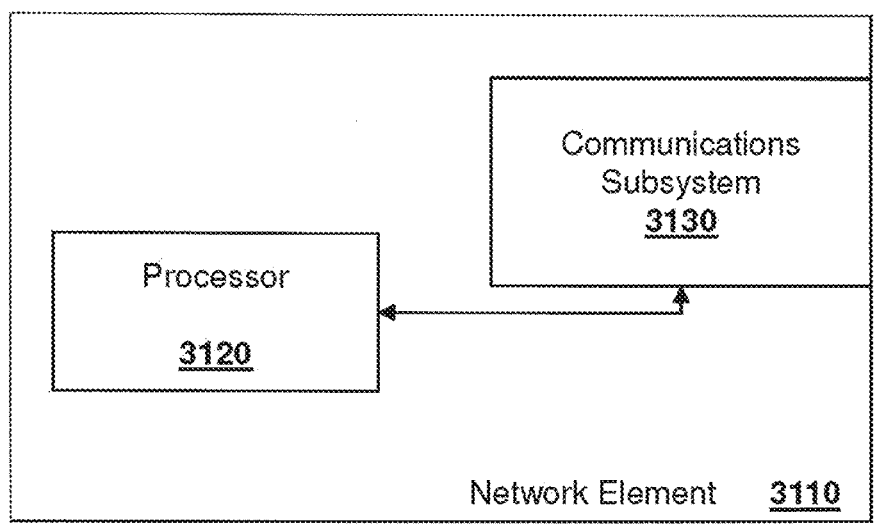
FIG. 23 is a simplified block diagram of an exemplary network element according to one embodiment.

The above may be implemented by a network element. A simplified network element is shown with regard to FIG. 23. In the figure, network element 3110 includes a processor 3120 and a communications subsystem 3130, where the processor 3120 and communications subsystem 3130 cooperate to perform the methods described above.

Figure 24:
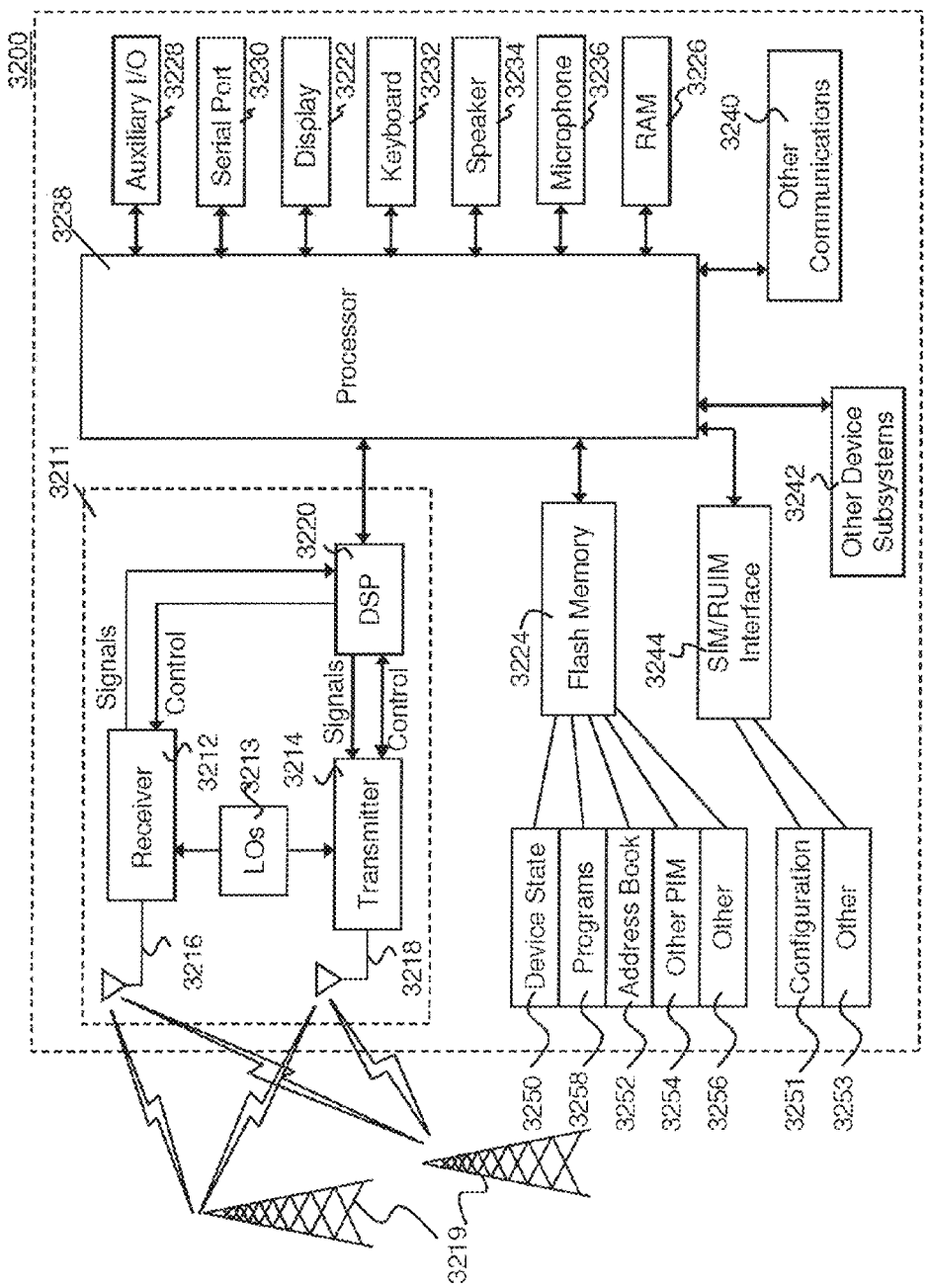
FIG. 24 is a block diagram with an example user equipment capable of being used with the systems and methods in the embodiments described herein.

Further, the above may be implemented by a UE. One exemplary device is described below with regard to FIG. 24. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219. As illustrated in the figure, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in the figure perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 25:
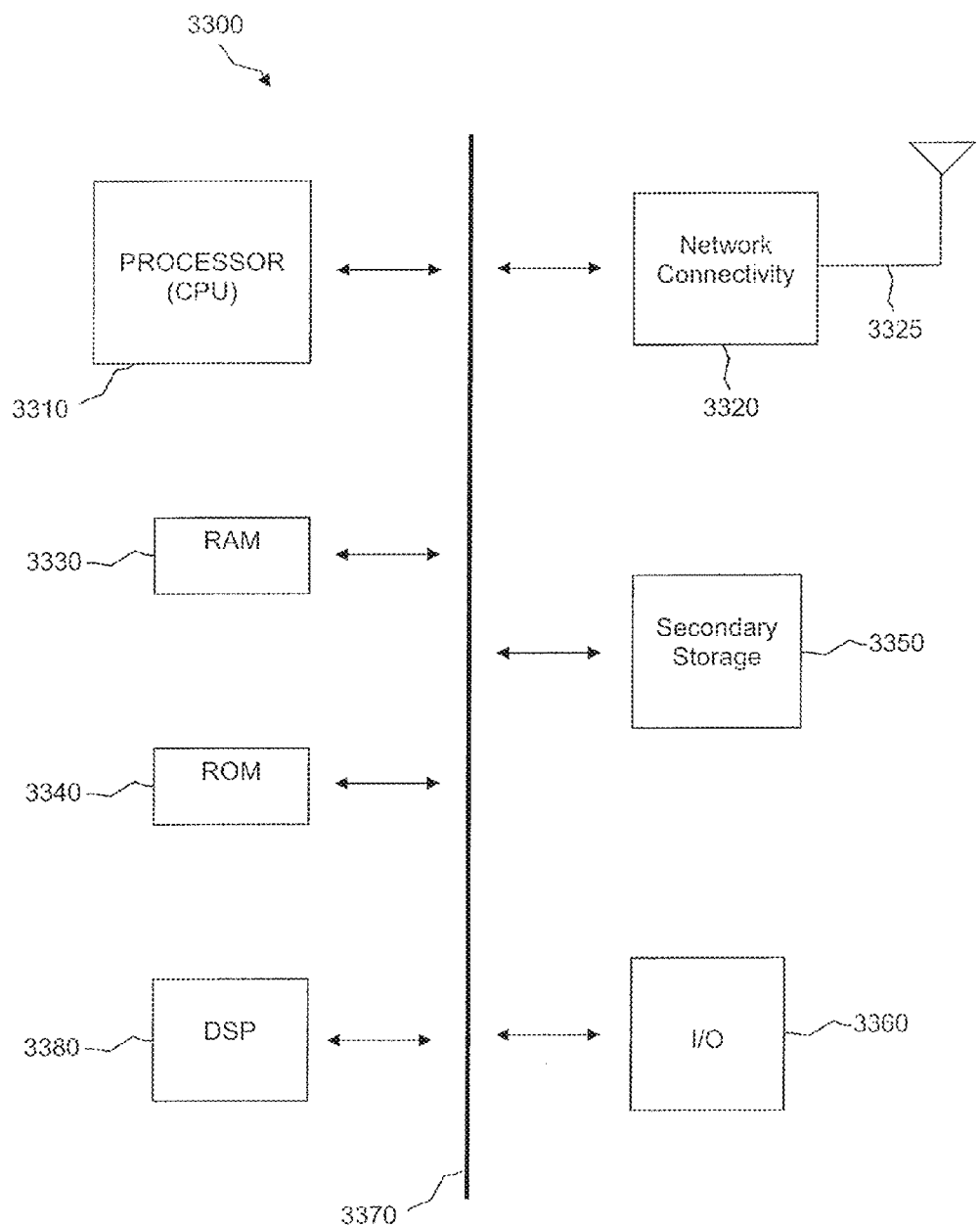
FIG. 25 illustrates a processor and related components suitable for implementing the several embodiments of the present disclosure.

The UE and other components described above might include a processing component that is capable of executing instructions related to the actions described above. FIG. 25 illustrates an example of a system 3300 that includes a processing component 3310 suitable for implementing one or more embodiments disclosed herein. In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an embodiment, a method for communication in a wireless telecommunications system is provided. The method comprises receiving, by a UE, configuration information specifying at least one transmission opportunity in which the UE is to transmit a first reference signal and further specifying at least one parameter applicable to the transmission of the first reference signal. The method further comprises transmitting, by the UE, the first reference signal in the specified transmission opportunity. The configuration information is received via at least one of radio resource control signaling or medium access control signaling, and the transmission opportunity occurs as one of a single transmission opportunity or a portion of a pattern of transmission opportunities.

In another embodiment, another method for communication in a wireless telecommunications system is provided. The method comprises receiving, by a first UE, a reference signal transmitted by a second UE and transmitting, by the first UE to a network node, a report indicating that the reference signal was received. The reference signal is received in a detection opportunity that occurs as one of a single detection opportunity or a portion of a pattern of detection opportunities.

In another embodiment, a network node is provided. The network node comprises a transmission component, a reception component, and a processing component. The transmission component is configured such that the network node transmits, to a first UE, configuration information specifying at least one transmission opportunity in which the first UE is to transmit a reference signal and further specifying at least one parameter applicable to the transmission of the reference signal. The reception component is configured such that the network node receives, from a second UE, a report indicating that the second UE received the reference signal from the first UE. The processing component is configured such that the network node determines, based on the report, that the first UE is in the proximity of the second UE.

The following is incorporated herein by reference for all purposes: 3GPP Technical Specification (TS) 36.331.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication in a wireless telecommunications system, the method comprising:
   receiving, by a first user equipment (UE), a proximity beacon transmitted by a second UE according to at least one parameter applicable to the proximity beacon, wherein the proximity beacon is transmitted in a medium access control (MAC) message over a physical layer (PHY) channel;
   transmitting, by the first UE to a network node, a report indicating that the proximity beacon was received and a transmission opportunity during which the proximity beacon was received; and
   receiving, by the first UE and from the network node, an identity associated with the second UE according to contents of the proximity beacon and in response to transmitting the report to the network node,
   wherein the proximity beacon is received in a detection opportunity that occurs as a portion of a pattern of detection opportunities,
   wherein the at least one parameter comprises the pattern and a transmission window defining a period including the transmission opportunity during which the proximity beacon is received, the pattern indicating a set of subframes in which the proximity beacon is to be transmitted during the transmission window, and
   wherein the first UE soft combines multiple transmissions of the proximity beacon based on the pattern of the detection opportunities.

2. The method of claim 1, wherein the first UE transmits another proximity beacon that has a second at least one parameter that is the same as the at least one parameter of the proximity beacon transmitted by the second UE, wherein the transmission of the other beacon occurs in the transmission opportunity at a different time and in a different subframe than the detection opportunity in which the first UE receives the proximity beacon from the second UE.

3. The method of claim 2, wherein the transmission opportunity and the detection opportunity occur as a portion of a pattern of transmission opportunities and detection opportunities, and wherein the pattern of transmission opportunities and detection opportunities is configured such that the first UE has at least one transmission opportunity to each other UE in a plurality of UEs that includes the first UE and has at least one detection opportunity from each other UE.

4. The method of claim 3, wherein the pattern of transmission opportunities and detection opportunities is configured such that a total amount of time for transmission opportunities and detection opportunities is minimized.

5. The method of claim 2, wherein the report to the network node includes an identifier associated with at least one of the transmission opportunity and the parameter of the proximity beacon received by the first UE.

6. The method of claim 1, wherein the first UE is provided with an indication of an action the first UE is to take for detection in cases where beacon transmission or reception is configured to occur when the first UE is in a discontinuous reception (DRX) OFF state, the indication of the action specifying that the first UE shall remain in the DRX OFF state for only transmission or reception of proximity beacons, but not both.

7. The method of claim 1, wherein the first UE tracks the second UE by at least one of:
   not attempting to detect proximity beacons from any UEs other than the second UE; or
   attempting to detect proximity beacons from the second UE more frequently than attempting to detect proximity beacons from UEs other than the second UE.

8. The method of claim 1, wherein the first UE attempts to detect at least one of:
   all proximity beacons available to the first UE; or
   a subset of all proximity beacons available to the first UE, wherein the subset is specified by the network node.

9. The method of claim 1, wherein at least one proximity beacon for the first UE to detect is indicated by specifying resources, in at least one of: a system information block (SIB) message or a radio resource control message (RRC), where the proximity beacons are transmitted, and wherein the first UE attempts to detect all proximity beacons in the resources.

10. The method of claim 1, wherein the report provides at least one of:
    an indication that the proximity beacon transmitted by the second UE was detected; or
    an indication of the strength of the proximity beacon transmitted by the second UE.

11. A non-transitory computer medium storing computer readable instructions executable by a processor to implement a method for communication in a wireless telecommunications system, the method comprising:
    receiving, by a first user equipment (UE), a proximity beacon transmitted by a second UE according to at least one parameter applicable to the proximity beacon, wherein the proximity beacon is transmitted in a medium access control (MAC) message over a physical layer (PHY) channel;
    transmitting, by the first UE to a network node, a report indicating that the proximity beacon was received and a transmission opportunity during which the proximity beacon was received; and
    receiving, by the first UE and from the network node, an identity associated with the second UE according to contents of the proximity beacon and in response to transmitting the report to the network node,
    wherein the proximity beacon is received in a detection opportunity that occurs as a portion of a pattern of detection opportunities,
    wherein the at least one parameter comprises the pattern and a transmission window defining a period including the transmission opportunity during which the proximity beacon is received, the pattern indicating a set of subframes in which the proximity beacon is to be transmitted during the transmission window, and
    wherein the first UE soft combines multiple transmissions of the proximity beacon based on the pattern of the detection opportunities.

12. The non-transitory computer medium of claim 11, wherein the first UE transmits another proximity beacon that has a second at least one parameter that is the same as the at least one parameter of the proximity beacon transmitted by the second UE, wherein the transmission of the other beacon occurs in the transmission opportunity at a different time and in a different subframe than the detection opportunity in which the first UE receives the proximity beacon from the second UE.

13. The non-transitory computer medium of claim 12, wherein the transmission opportunity and the detection opportunity occur as a portion of a pattern of transmission opportunities and detection opportunities, and wherein the pattern of transmission opportunities and detection opportunities is configured such that the first UE has at least one transmission opportunity to each other UE in a plurality of UEs that includes the first UE and has at least one detection opportunity from each other UE.

14. The non-transitory computer medium of claim 13, wherein the pattern of transmission opportunities and detection opportunities is configured such that a total amount of time for transmission opportunities and detection opportunities is minimized.

15. The non-transitory computer medium of claim 12, wherein the report to the network node includes an identifier associated with at least one of the transmission opportunity and the parameter of the proximity beacon received by the first UE.

16. The non-transitory computer medium of claim 11, wherein the first UE is provided with an indication of an action the first UE is to take for detection in cases where beacon transmission or reception is configured to occur when the first UE is in a discontinuous reception (DRX) OFF state, the indication of the action specifying that the first UE shall remain in the DRX OFF state for only transmission or reception of proximity beacons, but not both.

17. The non-transitory computer medium of claim 11, wherein the first UE tracks the second UE by at least one of:
    not attempting to detect proximity beacons from any UEs other than the second UE; or
    attempting to detect proximity beacons from the second UE more frequently than attempting to detect proximity beacons from UEs other than the second UE.

18. The non-transitory computer medium of claim 11, wherein the first UE attempts to detect at least one of:
    all proximity beacons available to the first UE; or
    a subset of all proximity beacons available to the first UE, wherein the subset is specified by the network node.

19. The non-transitory computer medium of claim 11, wherein at least one proximity beacon for the first UE to detect is indicated by specifying resources, in at least one of: a system information block (SIB) message or a radio resource control message (RRC), where the proximity beacons are transmitted, and wherein the first UE attempts to detect all proximity beacons in the resources.

20. The non-transitory computer medium of claim 11, wherein the report provides at least one of:
    an indication that the proximity beacon transmitted by the second UE was detected; or
    an indication of the strength of the proximity beacon transmitted by the second UE.

21. A user equipment (UE), the UE comprising:
    a storage device; and
    a processor configured to execute instructions stored on the storage device such that when executed, cause the UE to:
      receive a proximity beacon transmitted by a second UE according to at least one parameter applicable to the proximity beacon, wherein the proximity beacon is transmitted in a medium access control (MAC) message over a physical layer (PHY) channel;
      transmit, to a network node, a report indicating that the proximity beacon was received and a transmission opportunity during which the proximity beacon was received; and
      receive, from the network node, an identity associated with the second UE according to contents of the proximity beacon and in response to transmitting the report to the network node, wherein the proximity beacon is received in a detection opportunity that occurs as a portion of a pattern of detection opportunities, wherein the at least one parameter comprises the pattern and a transmission window defining a period including the transmission opportunity during which the proximity beacon is received, the pattern indicating a set of subframes in which the proximity beacon is to be transmitted during the transmission window, and wherein the UE soft combines multiple transmissions of the proximity beacon based on the pattern of the detection opportunities.

22. The UE of claim 21, wherein the UE transmits another proximity beacon that has a second at least one parameter that is the same as the at least one parameter of the proximity beacon transmitted by the second UE, wherein the transmission of the other beacon occurs in the transmission opportunity at a different time and in a different subframe than the detection opportunity in which the UE receives the proximity beacon from the second UE.

23. The UE of claim 22, wherein the transmission opportunity and the detection opportunity occur as a portion of a pattern of transmission opportunities and detection opportunities, and wherein the pattern of transmission opportunities and detection opportunities is configured such that the UE has at least one transmission opportunity to each other UE in a plurality of UEs that includes the UE and has at least one detection opportunity from each other UE.

24. The UE of claim 23, wherein the pattern of transmission opportunities and detection opportunities is configured such that a total amount of time for transmission opportunities and detection opportunities is minimized.

25. The UE of claim 22, wherein the report to the network node includes an identifier associated with at least one of the transmission opportunity and the parameter of the proximity beacon received by the UE.

26. The UE of claim 21, wherein the UE is provided with an indication of an action the UE is to take for detection in cases where beacon transmission or reception is configured to occur when the UE is in a discontinuous reception (DRX) OFF state, the indication of the action specifying that the UE shall remain in the DRX OFF state for only transmission or reception of proximity beacons, but not both.

27. The UE of claim 21, wherein the UE tracks the second UE by at least one of:
not attempting to detect proximity beacons from any UEs other than the second UE; or
attempting to detect proximity beacons from the second UE more frequently than attempting to detect proximity beacons from UEs other than the second UE.

28. The UE of claim 21, wherein the UE attempts to detect at least one of:
all proximity beacons available to the UE; or
a subset of all proximity beacons available to the UE, wherein the subset is specified by the network node.

29. The UE of claim 21, wherein at least one proximity beacon for the UE to detect is indicated by specifying resources, in at least one of: a system information block (SIB) message or a radio resource control message (RRC), where the proximity beacons are transmitted, and wherein the UE attempts to detect all proximity beacons in the resources.

30. The UE of claim 21, wherein the report provides at least one of:
an indication that the proximity beacon transmitted by the second UE was detected; or
an indication of the strength of the proximity beacon transmitted by the second UE.

* * * * *